United States Patent

Hillen et al.

[11] Patent Number: 5,315,631
[45] Date of Patent: May 24, 1994

[54] METHOD OF GENERATING X-RAY IMAGES, AND X-RAY APPARATUS FOR CARRYING OUT THE METHOD

[75] Inventors: Walter Hillen, Aachen, Fed. Rep. of Germany; Rudolph M. Snoeren, Veldhoven, Netherlands

[73] Assignee: U.S. Philips Corporation, New York, N.Y.

[21] Appl. No.: 21,923

[22] Filed: Feb. 24, 1993

[30] Foreign Application Priority Data

Feb. 24, 1992 [DE] Fed. Rep. of Germany ....... 4205522

[51] Int. Cl.[5] .............................................. H05G 1/64
[52] U.S. Cl. ................................. 378/98.8; 378/62
[58] Field of Search .................... 378/99, 98, 62; 358/111; 250/370.09

[56] References Cited

U.S. PATENT DOCUMENTS

| | | | |
|---|---|---|---|
| 4,245,158 | 1/1987 | Burstein et al. | 250/370.09 |
| 4,901,336 | 2/1990 | Nishiki | 378/99 |
| 4,991,192 | 2/1991 | Nishiki | 378/99 |

*Primary Examiner*—David P. Porta
*Attorney, Agent, or Firm*—Jack D. Slobod

[57] ABSTRACT

X-ray images are generated from a CCD image sensor having an image section and at least one storage section by performing a first X-ray exposure during a first time interval ($T_1$) which is shorter than the read-out period ($T_r$) of an image stored in the storage section of the CCD image sensor (7) to form a first image in the image section, transferring the first image from the image section to the storage section after expiration of the first time interval ($T_1$), performing a second X-ray exposure directly after or a small interval in time after the first X-ray exposure during a second time interval ($T_2$) which is short in comparison with the read-out period ($T_r$) to form a second image in the image section, reading out the first image from the storage section and writing the first image into a further memory, transferring the second image from the image section to the storage section after reading out the first image, and reading out the second image and summing it with the first image written in the further memory.

8 Claims, 3 Drawing Sheets

METHOD OF GENERATING X-RAY IMAGES, AND X-RAY APPARATUS FOR CARRYING OUT THE METHOD

BACKGROUND OF THE INVENTION

1. Field of the Invention

The invention relates to a method of generating X-ray images by means of an X-ray image converter and a CCD image sensor.

2. Description of the Related Art

Such a method and X-ray apparatus are known from U.S. Pat. No. 4,901,336. They are based on an image sensor which converts the output image of an X-ray image intensifier into electric signal and which is conceived for a given image frequency (30 frames per second). At the end of each image period, the image is transferred, using a transfer pulse, to the storage section of the CCD image sensor wherefrom it is read out during the generating of the next image. In order to enable the such an image sensor to form also X-ray images whose exposure time exceeds one image period the series of transfer pulses is interrupted during an X-ray exposure.

In the case of an angiographic examination, for example an examination of the coronary vessels by means of a contrast medium, however, the aim is to obtain an X-ray image in an as short as possible period of time. Such an examination first takes place in a fluoroscopy made during which the examination zone is continuously irradiated with a comparatively low dose rate. The fluoroscopic images have a small signal-to-noise ratio due to the low dose administered or the small dose per fluoroscopic image. The image quality thus obtained, however, is sufficient to trace the propagation of the contrast medium in the vessels.

In order to enable reproduction of given phases of propagation of the contrast medium, X-ray images are made. These X-ray exposures are repeated with a time interval which is long in comparison with the duration of an image period (in the fluoroscopy mode). In order to obtain a suitable signal-to-noise ratio, each X-ray exposure requires a dose which is substantially higher than these of a single image in the fluoroscopy mode, and the exposure duration should be shorter than the duration of one image period in the fluoroscopy mode in order to ensure that the motional unsharpness in the X-ray image remains limited.

However, it has been found that such CCD image sensor is not capable of achieving the image quality that can be achieved by means of a directly exposed X-ray-film intensifier foil system with such high doses and high spatial frequencies.

It is an object of the present invention to conceive a method of the kind set forth so that an improved image quality of the X-ray image is achieved, also in the case of fast physiological processes. This object is achieved in accordance with the invention in that the method comprises the following steps:

a) Performing a first X-ray image exposure during a first time interval which is shorter than the read-out period of an image stored in the storage section of the CCD image sensor, b) transferring the first image generated in the image section of the CCD image sensor during the first X-ray exposure to the storage section thereof after expiration of the first time interval, c) performing a second X-ray exposure directly after or at a short distance in time from the first X-ray exposure during a second time interval which is short in comparison with the read-out period, d) reading out the first image from the storage section and writing the image into a further memory, e) transferring the second image to the storage section after the reading out of the first image, f) reading out the second image and summing it with the first image stored in the further memory so as to produce the X-ray image.

The invention is based on the following considerations:

In the case of a small X-ray dose per single image, the signal-to-noise ratio of this single image is determined essentially by the statistics of the X-ray quanta, because the noise caused by the transfer chain consisting of the X-ray image converter and the CCD sensor is negligibly small in comparison with the quantum noise.

In the case of a high X-ray dose per single image, however, the limited storage capacity of the CCD image sensor becomes manifest: customary CCD image sensors can only store a given number of electrons per CCD cell (a CCD cell stores a charge corresponding to the brightness at a pixel). For video sensors, this number amounts to from 50,000 to 100,000 electrons. In order to avoid overdriving of the CCD image sensor, the mean image brightness should correspond to a lower number, for example 20,000. This corresponds to a white noise (shot noise) of 141 electrons. This noise is independent of the spatial frequency.

However, because of the pronounced decrease of the modulation transfer function for high spatial frequencies, the brightness signal (and hence the associated noise determined by the statistics of the X-ray quanta) is reduced to such an extent that the noise is no longer determined by the statistics of the X-ray quanta, but rather by the statistics of the charge carriers that can be stored in a CCD cell. The spatial resolution of the detector is thus limited.

In accordance with the invention, the image quality is improved in that (at least) two images are added so as to form an X-ray image so that the number of electrons per pixel is increased accordingly by a factor 2. As a result, the signal-to-noise ratio determined by the statistic of the charge carriers that can be stored in a CCD cell is increased in conformity with the square root of this factor (3 dB).

From U.S. Pat. No. 4,901,336 it is known per se to add a plurality of single images generated during an image period so as to obtain an X-ray image. Therefore, the exposure time of such an X-ray image amounts to a multiple of a single image period (40 ms). Therefore, the known method is suitable only for slowly moving or even stationary structures. This known method is not suitable for the recording of fast motions, for example the propagation of a contrast medium in the coronary vessels.

SUMMARY OF THE INVENTION

In accordance with the invention, however, use is made of the special property of CCD image sensors that two (in the case of other types also three) images can be buffered in the sensor. During normal operation of a CCD image sensor, at the end of an image period the image generated in the image section of a CCD image sensor is transferred to the storage section within microseconds by a transfer pulse. It is read out therefrom substantially during the full next image period during which the next image is generated in the image section of the CCD image sensor.

In accordance with the invention, a first image is composed within a time interval (for example, a few ms) which is small in comparison with the duration of an image period (for example, 40 ms) or the read-out period. Directly after the end of this interval, this image is transferred to the storage section, followed directly by a second time interval which has the same duration as the first time interval and during which the next image is composed in the image section. Evidently, during the time intervals the X-ray exposure should be so intense that as high as possible charges occur in the individual CCD cells, without the maximum charge being reached in the image areas which are important for the diagnosis.

Thus, in accordance with the invention two X-ray exposures are performed within a brief period of time (in comparison with the read-out period), said exposures resulting, after summing of the two images, in an X-ray image exhibiting insignificant motional unsharpness only. Contrary to the normal operation of a CCD image sensor, after the end of the second time interval or the second X-ray exposure, the first image is still read out, partly or completely, from the image memory. The second image is transferred to the image memory only after the end of this read-out operation, followed by the reading out of the second image from the image memory.

In a further elaboration of the invention, the steps a) to f) are repeated after a period of time whose duration is greater than twice the read-out period. This results in a series of X-ray exposures with a comparatively low image frequency (for example, six images per second or less) but with a high image quality. The various phases of motion of a quickly moving object can thus be suitably reproduced.

In a further version of the invention, involving a CCD image sensor comprising two storage sections, after the first X-ray exposure the first image is first transferred to the first storage section, after the second X-ray exposure the second image being transferred to the first storage section and there being performed a third X-ray exposure, the three images produced by three X-ray exposures being successively read out and added to one another. As a result of the addition of the three images simultaneously processed in the CCD image sensor, this version, suitable for CCD image sensors of the frame interline transfer type, offers an X-ray exposure with an even better image quality.

An X-ray apparatus for carrying out the method in accordance with the invention and comprising an X-ray source for irradiating an examination zone, an X-ray image converter for converting the X-rays incident to the other side of the examination zone into a visible image, an image pick-up device comprising an image sensor for converting the visible image into electric signals, a further memory for storing the electric signals, and a control unit for controlling the components of the X-ray apparatus, is characterized in that there are provided means for the pixel-wise addition of the image read out from the CCD image sensor to the image stored in the further memory, the control unit controlling the components so that two or more brief X-ray exposures are performed at a small interval in time from one another, the images thus generated successively passing through the storage section or sections of the CCD image sensor, the images being successively read out from the storage section stored and added to one another.

BRIEF DESCRIPTION OF THE DRAWINGS

The invention will be described in detail hereinafter with reference to the drawing. Therein.

DETAILED DESCRIPTION OF THE PREFERRED EMBODIMENT

Figure 1:
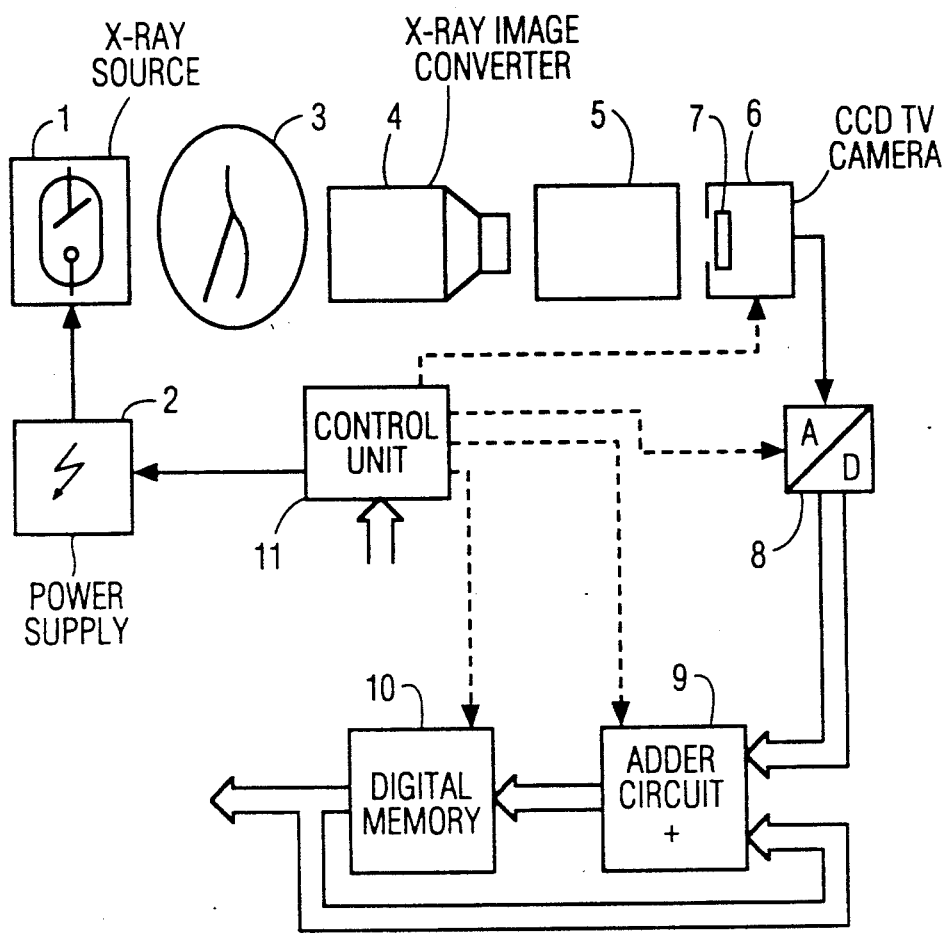
FIG. 1 shows a block diagram of an examination apparatus.

The X-ray examination apparatus shown in FIG. 1 comprises an X-ray source 1 and an X-ray powersuply 2 which supplies the voltages and currents required by the X-ray source. The radiation emitted by the X-ray source irradiates an examination zone in which there is positioned an object 3 for example a patient in whose coronary vesels a previously injected contrast medium propagates. An X-ray image converter 4 converts the X-ray image produced into a visible image. For the X-ray image converter use is preferably made of an X-ray image intensifier of a high spatial resolution which converts the X-ray image on its entrance screen into a visible, reduced image on its output screen. This image is applied, via an optical system 5, to a television camera 6 comprising a high-resolution CCD image sensor 7 for, for example, 1000×1000 or 2000×2000 pixels. The television camera 6 converts the visible image imaged onto its entrance screen, via the optical system 5, into an electric signal which itself is converted into a series of digital data words by an analog-to-digital converter 8.

The output of the analog-to-digital converter 8 is connected, via an adder circuit 9, to a digital memory 10 which comprises a storage location for each pixel of the CCD image sensor, it being possible to store a value corresponding to the exposure of the relevant pixel in each of said locations. The output of the memory is connected to a further input of the adder circuit 9 so that, when desired, an image stored in the memory 10 and an image supplied by the television camera 6 can be pixel-wise added to one another and written into the memory 10 again. The adder circuit, which may be a part of a suitable image processing computer, should be constructed and be arranged in the signal path or be programmed so that a different mode of operation the image values associated with the individual pixels are written directly into the memory 10, i.e. without addition to the image values of a previous image. The content of the digital memory can be applied to a monitor or to an image output unit (hard copy unit). Moreover, for filing purpose it can be written into a bulk memory, for example a magnetic disc memory unit. These units are not shown in FIG. 1.

The individual components 1 to 10 of the X-ray apparatus are controlled, as denoted by dashed lines, by a control unit 11 which itself can be controlled by the operator. The control unit 11 may comprise a suitably programmed processor and need not include all control circuits required for operation of the various components. For example, the pulse pattern generator supplying the necessary control signals and pulse series for executing the image transfer and the reading of an image in the CCD image sensor can be physically integrated in the camera 6. Thus, the control unit 11 need merely be capable of controlling this generator in the specified manner.

The X-ray examination apparatus shown in FIG. 1 is suitable for operation in the fluoroscopy mode as well as in the exposure made.

In the fluoroscopy mode, the X-ray generator 2 is adjusted so that the X-ray source 1 continuously emits X-rays, although with a small dose rate. The fluoroscopic image appearing at the exit of the X-ray image intensifier 4 is picked up by the television camera 6 so as to be converted into electric signals. The image section of the CCD 7 is then exposed during an image period which may have a duration of, for example 40 ms, corresponding to an image frequency of 25 images per second. During this image period, the previous fluoroscopic image, present in the storage section of the CCD image 7, is read out and applied to the analog-to-digital converter. At the end of the image period, the fluoroscopic image generated in the image section is transferred to the storage section by a transfer pulse so as to be read during the next image period during which the image section is already exposed to the next fluoroscopic image. Instead of 25 complete images, 50 frames can also be generated according to the so-called interlace process. The image period or the read out period then amounts to only half of that in the case of a complete image.

The image signals supplied by the television camera 6 are digitized by the analog-to-digital converter 8 and are written directly, i.e. without addition (in a manner not shown), into the image memory 10 so that at the end of an image period the digital image memory 10 stores the fluoroscopic image built up in the image section of the CCD image sensor 7 during the preceding image period. The fluoroscopic images from the memory 10 are continuously displayed by means of a suitable display apparatus. The fluoroscopy mode of the system shown in FIG. 1 corresponds to the normal mode of the X-ray apparatus known from U.S. Pat. No. 4,901,336; it does not form part of the present invention.

In the fluoroscopy mode, the dose rate is so low that each fluoroscopic image is generated with a low dose only. Consequently, the individual fluoroscopic images contain a large amount of noise. This noise is slightly mitigated during observation of the image of the display apparatus because the eye of the observer integrates several successive fluoroscopic images in view of the comparatively high image rate. The image quality thus obtained is for the observer to follow the propagation of the contrast medium in the coronary vessels of the patient 3.

When the contrast medium reaches a region which is important for the diagnosis, the operator switches over to the exposure mode. In the exposure mode, X-ray images of high quality and low motional unsharpness are generated at a low image frequency (6 exposures per second or less), said X-ray images representing the various phases of the propagation of the contrast medium in the region important for the diagnosis.

Figure 2:
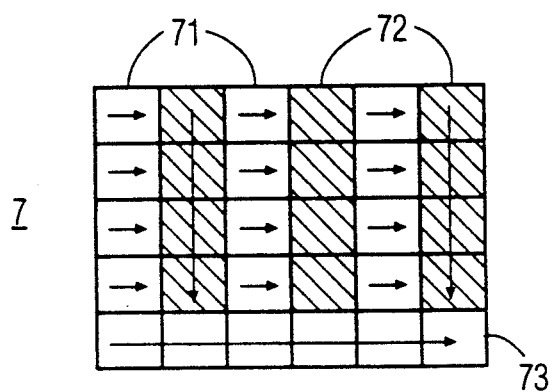
FIG. 2 shows a diagram of a CCD image sensor of a first type.
Figure 4:
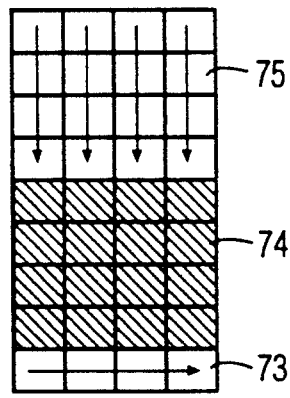
FIG. 4 shows a CCD image sensor of a second type.
Figure 5:
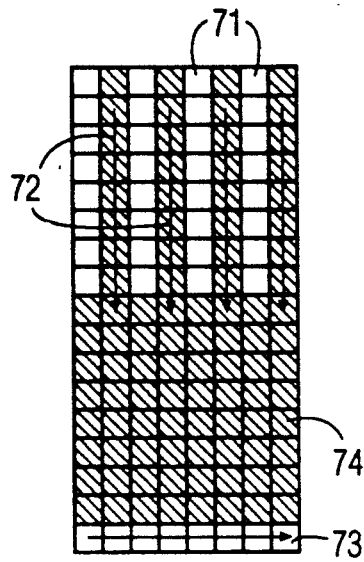
FIG. 5 shows a CCD image sensor of a third type.

The exposure mode will be described in detail hereinafter with reference to the FIGS. 2 and 3. FIG. 2 shows diagrammatically a CCD image 7 of the interline transfer type. This image 7, and the image 7 shown in the FIGS. 4 and 5, are known from the publication by M. Kriss et al. "Critical technologies for electronic still imaging systems", Proc. SPIE 1082, 1989, p. 157 ff. The image section consists of a plurality of vertical columns 71, each of which comprises a plurality of CCD image sensors. The storage section consists of the same number of columns 72, each column comprising the same number of CCD cells as the columns 71. These CCD cells, however, are shielded against incident light. The columns 72 can be arranged adjacent the columns 71 in an alternating fashion, as shown in the drawing, or can be arranged each time underneath a column 71 so that they cannot be struck by light. The transfer of an image from the image section 71 to the storage section 72 takes place in that the charge carriers of all CCD cells are simultaneously transferred to the corresponding cells of the associated column 72 of the storage section. This transfer can take place within a few microseconds.

During read out, the CCD cells of a column operate as a shift register, the charge packets stored in the CCD cells then successively traversing the neighbouring CCD cells. The charge packets thus step-wise shifted out of the columns are stored in a horizontal shift register 73 which comprises as many registers or CCD cells as there are columns. The charge carriers in the register 73 are shifted from cell to cell been completely read out before the next charge packets are taken up from the register 72. The described shifting of the charge carriers during transfer as well as during read-out is denoted by arrows in FIG. 2.

Figure 3:
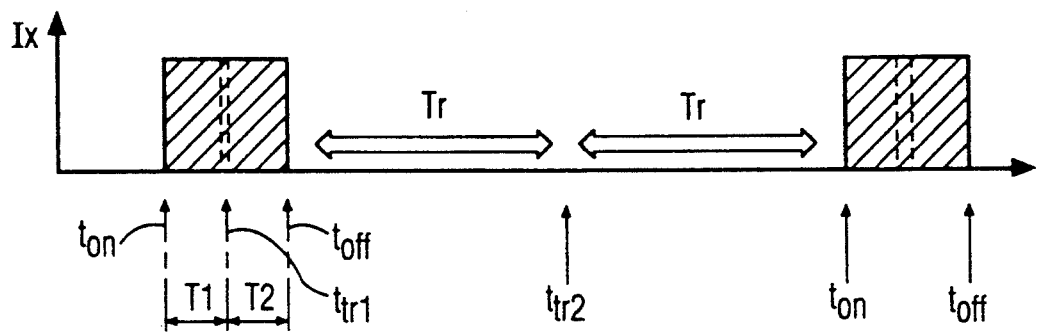
FIG. 3 shows the execution in time of the X-ray exposure and the charge carrier transport in such a CCD image sensor using the method in accordance with the invention.

FIG. 3 shows the formation in time of an X-ray image and the position in time of the transfer and read-out operations. The intensity $I_x$ of the X-rays is shown as an ordinate.

At the nstant $t_{on}$ the X-rays are switched on with an intensity $I_x$ which is so high that within an interval $T_1$, being substantially shorter than one image period or the time $T_r$ required for a read-out operation and amounting to, for example 5 ms, a number of charge carriers appears in the CCD cells of the image section 71 which is substantially larger than the number appearing in the fluoroscopy mode. The light intensity within the interval $T_1$ is then adapted so that as many charge carriers as possible are accumulated in the CCD cells, but not so many that overdriving occurs in the image sections which are important for the diagnosis or that the maximum number of charge carriers that can be stored in the associated cells is reached.

At the end of the interval $T_1$, i.e. at the instant $t_{tr1}$, a transfer pulse transfers the first image thus generated from the image section to the storage section. At the same time, during a second interval $T_2$ which is directly consecutive to $T_1$ and which is preferably of the same length as $T_1$, the generating of a second image commences, the X-ray source remaining switched on with the same intensity. At the end of the second interval $T_2$, i.e. at the instant $t_{off}$ the X-ray source is switched off.

The first image is read out from the storage section during the interval $T_r$, directly subsequent to the instant $t_{off}$. However, it is alternatively possible to commence the reading out of the first image already during the writing of the second image, but also only after a normal image period (40 ms) has elapsed since the instant $t_{on}$. In any case, the read-out operation for the first image terminates substantially later than the expiration of the interval $T_2$ during which the second image generated.

The transfer pulse for transferring the second image from the image section to the storage section, therefore, may not be generated already at the end of the building up of the second image, as is customary, but only after termination of the read-out operation for the first image. This instant is denoted by the reference $t_{tr2}$ in FIG. 3. Reading out of the second image then takes place during an interval $T_r$.

Before the start of the read-out operation for the first image, the contents of the memory 10 are erased. Therefore, the first image after the read-out operation, the digitizing in the analog-to-digital converter 8 and the traversing of the adder 9 is stored without modification. However, when the second image is read out, the second image is pixel-wise added to the first image in the adder 9, the sum image thus generated being written into the memory 10. The sum image thus formed in the memory 10 represents the X-ray image. Due to the addition, the achievable signal-to-noise ratio may be up to 3 dB higher than the signal-to-noise ratio that can be achieved by means of a single image. The X-ray image contains comparatively few motional artefacts because it has been formed during a comparatively short of time $(T_1+T_2)$.

After a period of time of 150 ms or more, a new X-ray exposure can take place in order to form a further X-ray image.

The word width of the memory 10 must be at least one binary position greater than that of the analog-to-digital converter 8. For example, when the analog-to-digital converter produces data words having a word width of 8 bits, each memory location of the memory 10 should be capable of storing data words having a width of at least nine bits. Therefore, use is made of a memory having a 16-bit word width.

FIG. 4 shows a CCD image sensor of the frame transfer type. Such image sensors comprises a spatially coherent storage section 74 and a spatially coherent image section 75, each section consisting of the same number of columns and rows of CCD elements. When the image is transferred from the image section 75 to the storage section 74, the charge packets are shifted from the individual CCD cells of the image section into the storage section, each charge packet traversing as many CCD cells as there are cells in a column of the image section or the storage section. In this type of CCD image sensor, therefore, the transfer of the image takes more time (for example, 0.5 ms) than in the type shown in FIG. 2. The reading out by means of the horizontal shift register 73 (two or three of such registers may also be present), takes place in the same way as described with reference to FIG. 2.

The formation in time of an X-ray image produced by means of such a CCD image sensor can in principle be the same as shown in FIG. 3. However, should smearing or blurring effects occur due to the longer transfer times, it would be necessary to switch off the X-rays at the end of the interval $T_1$ and to switch the X-rays on again after a period of time of the order of magnitude of the transfer time. On the one hand, this makes the operation of the generator 2 more complex and on the other hand the overall exposure time for the X-ray image (from the beginning of the interval $T_1$ until the end of the interval $T_2$) is thus prolonged. Therefore, the type of image sensor shown in FIG. 2 is to be preferred.

Figure 6:
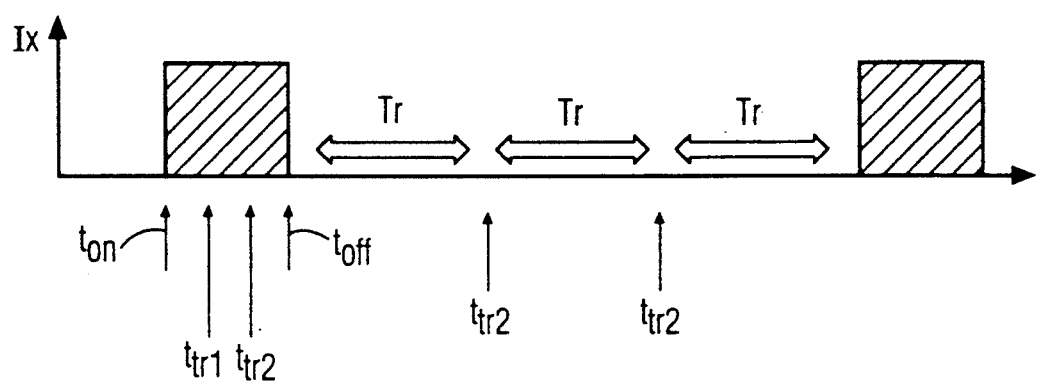
FIG. 6 shows the succession of X-ray exposures and charge carrier displacements in a CCD image sensor as shown in FIG. 5.

FIG. 5 shows a CCD image sensor of the frame interline transfer type. As is already indicated by its name, this sensor is a combination of the types shown in the FIGS. 2 and 4; in addition to an image section composed of a multitude of columns 71, this type comprises first storage section 72 which is composed of columns a shielded against incident light which correspond in number to columns 71 and a second, spatially coherent storage section 74. The image is very quickly transferred from the image section 71 to the first storage section 72 and at a later stage it is transferred (slightly slower) to the second storage section 74 wherefrom it can be read out by means of the horizontal register 73. This type thus comprises two storage sections, so that three images can be simultaneously processed. FIG. 6 shows the formation in time of an X-ray image by means of such an image sensor.

After the switching on of the X-rays at the instant $t_{on}$, a first image is formed in the image section. This image is transferred to the first storage section 72, after expiration of a time interval of, for example 5 ms, at the instant $t_{tr1}$. At the same time, the composition of the second image commences. After composition of the second image during an equally long interval (5 ms), it is transferred to the first storage section. However, before that it is necessary to transfer the first image from the first storage section 72 to the second storage section. This can take place directly after its transfer to the first storage section 72, but may alternatively take place briefly before the instant $t_{tr2}$.

Simultaneously with the transfer of the second image to the first storage section, the composition of the third image commences in the image section, said third image being completed after a third interval of the same length as the preceding intervals (at the instant $t_{off}$). Subsequently (however, in principle also already after the instant $t_{tr1}$), the reading out of the first image from the second storage section 74 may commence. This first image is written into the memory 10 after erasure of the contents of the latter.

Subsequent to the read-out operation for the first image, at the instant $t_{tr3}$, the second image is transferred from the first storage section 72 to the second storage section 74 after which it is read out, digitized and pixel-wise added to the first image stored in the memory 10. After the read-out operation for the second image, at the instant $t_{tr4}$ the third image is transferred to the second storage section 74, via the first storage section 71. The third image is then read out and pixel-wise added to the sum image which is stored in the memory 10 and which consists of the first two images.

The new sum image formed by the summing of the three images represents the X-ray image. In the case of high spatial frequencies (and a high X-ray dose for the three images constituting the X-ray image), this X-ray image has a signal-to-noise ratio which has been improved by up to 4.7 dB in comparison with an X-ray image consisting of only a single image. The image quality is thus further enhanced, be it at the expense of an overall exposure time which is increased 50% longer (in comparison with the use of a CCD image sensor comprising only one storage section). Moreover, a greater distance in time should exist between two X-ray exposure than in the method described with reference to FIG. 3; however, this reduced image frequency suffices for most medical applications.

We claim:
1. A method of generating X-ray images by means of an X-ray image converter and a CCD image sensor having an image section and at least one storage section, comprising the following steps:
 a) performing a first X-ray exposure during a first time interval ($T_1$) which is shorter than a read-out period ($T_r$) of an image stored in the storage section of the CCD image sensor to generate during the first exposure a first image in the image section of the CCD image sensor,
 b) transferring the first image from the image section to the storage section of the CCD image sensor after expiration of the first time interval ($T_1$),
 c) performing a second X-ray exposure after the first X-ray exposure during a second time interval ($T_2$) which is shorter than the read-out period ($T_r$) to generate during the second exposure a second image in the image section of the CCD image sensor,
 d) reading out the first image from the storage section and writing the first image in a further memory,
 e) transferring the second image from the image section to the storage section of the CCD image sensor after said reading out the first image, and
 f) reading out the second image from the storage section and summing it with the first image written in the further memory so as to produce the X-ray image.

2. A method as claimed in claim 1, characterized in that the steps a) to f) are repeated after a period of time whose duration is greater than twice the read-out period.

3. A method as claimed in claim 1 wherein said CCD image sensor has first and second storage sections, and after the first X-ray exposure the first image is transferred to the first storage section, after the second X-ray exposure the second image is transferred to the first storage section and the first image is transferred to the second storage section, and a third X-ray exposure is performed to generate a third image in the image section, the first, second and third images generated during the first, second and third X-ray exposures, respectively, being successively read out from the second storage section and added to one another.

4. A method as claimed in claim 1, characterized in that the X-ray exposures succeed one another without interruption.

5. An X-ray apparatus having components comprising an X-ray source for irradiating an examination zone in successive X-ray exposures, an X-ray image converter for converting X-rays exiting the examination zone as a result of an X-ray exposure into a visible image, an image pick-up device comprising a CCD image sensor for converting the visible image into electric signals, said CCD image sensor having an image section and one or more storage sections, a further memory for storing the electric signals, and further comprising a control unit for controlling said components of the X-ray apparatus, and means for the pixel-wise addition of an image read out from the CCD image sensor to an image stored in the further memory, the control unit comprising means configured for controlling the components so that two or more successive X-ray exposures generate respective images which pass through the one or more storage sections of the CCD image sensor, and are successively read out from a last of the one or more storage sections, and stored and added to one another.

6. A method as claimed in claim 2 wherein said CCD image sensor has first and second storage sections, and after the first X-ray exposure the first image is transferred to the first storage section, after the second X-ray exposure the second image is transferred to the first storage section and the first image is transferred to the second storage section, and a third X-ray exposure is performed to generate a third image in the image section, the first, second and third images generated during the first, second and third X-ray exposures, respectively, being successively read out from the second storage section and added to one another.

7. A method as claimed in claim 2, characterized in that the X-ray exposures succeed one another without interruption.

8. A method as claimed in claim 6, characterized in that the X-ray exposures succeed one another without interruption.